United States Patent
van Nieuwstadt

(10) Patent No.: US 6,732,723 B2
(45) Date of Patent: May 11, 2004

(54) METHOD AND SYSTEM FOR CONTROLLING EGR RATE IN DIESEL ENGINES

(75) Inventor: Michiel J. van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 10/063,261

(22) Filed: Apr. 4, 2002

(65) Prior Publication Data

US 2003/0188727 A1 Oct. 9, 2003

(51) Int. Cl.[7] ................................. F02B 47/08
(52) U.S. Cl. .................. 123/568.19; 123/361
(58) Field of Search .............. 123/568.19, 568.16, 123/568.21, 568.26, 568.12, 361, 399; 60/605.2

(56) References Cited

U.S. PATENT DOCUMENTS

| | | |
|---|---|---|
| 4,727,848 A | 3/1988 | Stumpp et al. |
| 5,738,126 A | 4/1998 | Fausten |
| 6,016,788 A | 1/2000 | Kibe et al. |
| 6,032,656 A | 3/2000 | Itoyama et al. |
| 6,067,800 A | 5/2000 | Kolmanovsky et al. |
| 6,105,559 A | 8/2000 | Stoltman |
| 6,128,902 A | 10/2000 | Kolmanovsky et al. |
| 6,289,883 B1 * | 9/2001 | Wakutani et al. ...... 123/568.21 |

FOREIGN PATENT DOCUMENTS

| | | | |
|---|---|---|---|
| JP | 2000303867 | * | 10/2000 |
| JP | 2000303896 | * | 10/2000 |
| JP | 2001165001 | * | 6/2001 |

* cited by examiner

Primary Examiner—Mahmoud Gimie

(57) ABSTRACT

A method and system for controlling EGR rats of an internal combustion engine includes measuring a mass airflow passing to the intake throttle and a desired mass airflow. An error signal is produced representative of a difference between the measured mass airflow and the desired mess airflow. A pair of control signals is produced in response to such produced error signal. One of the pair of control signals is used to adjust the intake throttle to control mass airflow through such intake throttle. The other one of the pair of control signals is used to adjust EGR flow through the EGR valve. The pair of control signals operates the intake throttle and the EGR valve to drive the error signal to a null. In one embodiment, one of the control signals used to adjust the EGR valve is used to provide such adjustment only when the intake throttle is in a position to provide substantially maximum mass airflow through such intake throttle to the intake of the engine. In another embodiment, the pair of control signals operates to drive the throttle to a closed position only when such error signal is unable to be driven towards the null solely from adjustment by the EGR valve.

14 Claims, 5 Drawing Sheets

METHOD AND SYSTEM FOR CONTROLLING EGR RATE IN DIESEL ENGINES

BACKGROUND OF INVENTION

1. Technical Field

This invention relates to engine control systems and more particularly to methods and systems for controlling EGR rate in diesel engines.

2. Background

As is known in the art, diesel engines provide great fuel economy benefits compared to stoichiometric spark ignited engines (e.g., gasoline internal combustion engines). As is also known in the art, it is desirable to reduce emissions from both types of such engines. One such emission to be reduced is NOx (oxides of nitrogen). One technique used to reduce such NOx emission is Exhaust Gas Recirculation (EGR). EGR operates by recirculating engine exhaust back to the engine's intake manifold. EGR uses an EGR valve disposed in a duct between the engine exhaust manifold and the engine intake manifold. To enable a flow of exhaust to pass from the exhaust manifold and the intake manifold through the EGR valve, a differential pressure must exist across the EGR valve. The intake throttle has the effect of creating a pressure in the intake manifold that is lower than the pressure in the exhaust manifold thereby providing the requisite differential pressure across the EGR valve.

With a diesel engine, the power developed by the engine is typically controlled by controlling the amount of fuel injected into the engine cylinders rather than through the use of a throttle at the intake of the engine. Thus, while it is desired to use EGR to reduce NOx in a diesel engine, the absence of a throttle may result in insufficient differential pressure across the EGR valve to obtain adequate EGR rates for required NOx reduction. Thus, with a diesel engine, while there may be the absence of a throttle for control of engine power, a throttle is sometimes placed in the path of the engine intake to obtain a differential pressure (and hence exhaust recirculation flow) across the EGR valve. Such technique has provided EGR rates of up to 60% of the in-cylinder flow through the EGR valve. One technique used to control the intake throttle of a diesel engine is to provide a nominal setpoint for the throttle. This setpoint is established as a function of engine speed, fuel quantity, engine temperature, ambient pressure and temperature. The EGR rate is controlled in closed loop fashion by regulating the EGR valve to achieve a setpoint established for a measured mass air flow through the throttle. A disadvantage of such technique is that, in general, the EGR valve is not as open as it could be, the pressure drop from the exhaust to the intake manifold is larger than it has to be, and pumping losses against the throttle are higher than necessary. The overall result is therefore a lower than optimal fuel economy.

SUMMARY OF INVENTION

In accordance with the present invention, a method is provided for controlling the EGR rate of an internal combustion engine. The engine has an intake throttle for controlling mass flow to an intake of the engine and an EGR valve for controlling flow from the exhaust of the engine back to the intake of the engine along with air passing through the intake throttle. The method includes measuring the mass air flow passing to the intake throttle. The measured mass air flow is compared with a desired mass air flow. An error signal is produced representative of a difference between the measured mass air flow and the desired mass air flow. A pair of control signals is produced in response to such produced error signal. One of the pair of control signals is used to adjust the intake throttle to control mass air flow through such intake throttle. The other one of the pair of control signals is used to adjust EGR rate through the EGR valve. The pair of control signals operate the intake throttle and the EGR valve to drive the error signal towards a null.

In one embodiment, one of the control signals used to adjust the EGR rate is used to provide such adjustment only when the intake throttle is in a position to provide substantially maximum mass air flow through such intake throttle to the intake of the engine.

In one embodiment the pair of control signals operate to drive the throttle to a closed position only when such error signal is unable to be driven towards the null solely from adjustment by the EGR valve.

In one embodiment, the engine includes a turbocharger having a compressor and a turbine coupled to the compressor. A portion of engine exhaust is directed to the EGR valve and another portion of the engine exhaust is directed to the turbine. The one of the control signals adjusting the EGR valve adjusts such portions. The portion of the engine exhaust to the turbine drives the compressor that in turn drives the mass air flow. The mass air flow from the compressor passes to the intake throttle and the intake throttle adjustment adjusts the mass air flow.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1:
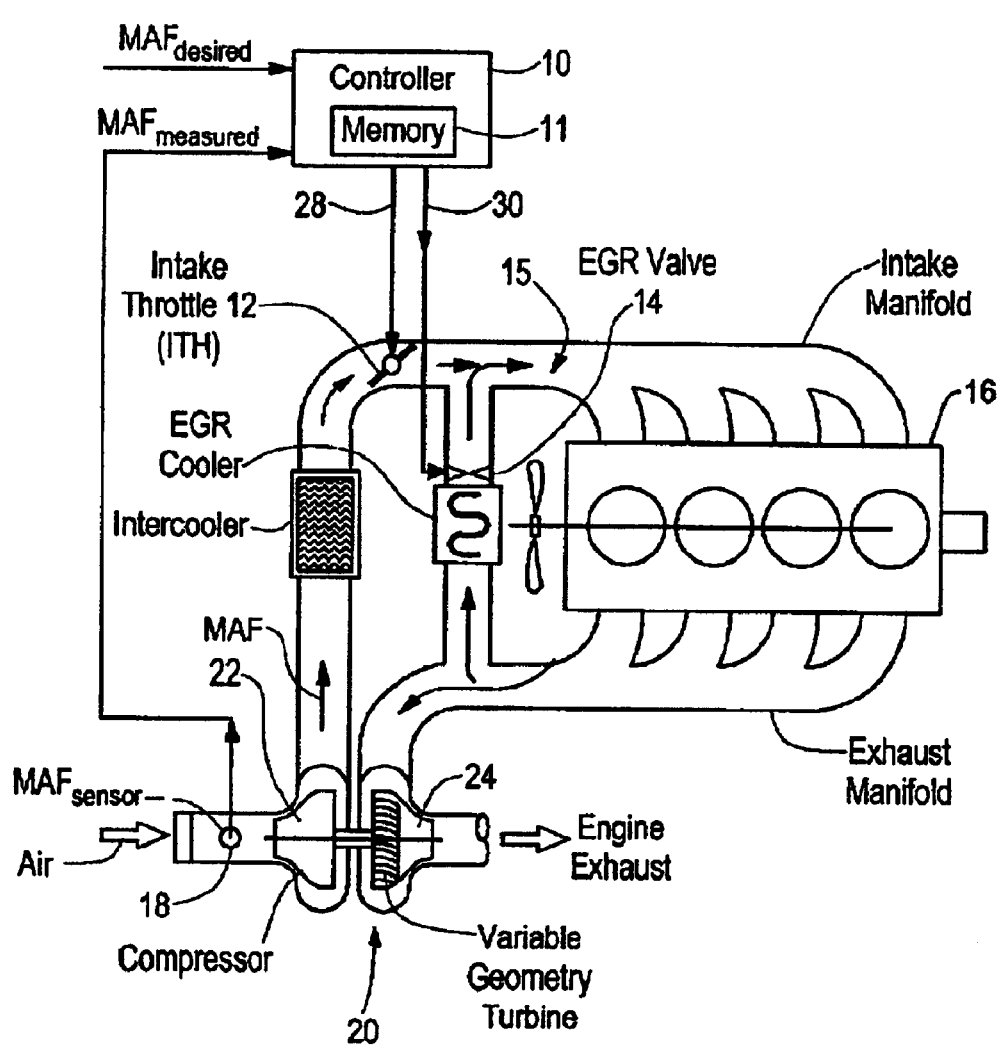
FIG. 1 is a block diagram of an engine control system coupled to an engine having EGR valve therein controlled by such controls system according to the invention.

Referring now to FIG. 1, an engine control system, here referred to as controller 10. The controller 10 controls the intake throttle (ITH) 12 and the EGR valve, here controlling an EGR valve 14 in response to a signal representing mass air flow (MAF) into the intake 15 of the engine 16 and a desired MAF, $MAF_{desired}$, (or MAF setpoint) as determined in a conventional manner by such things as engine speed, fuel quantity, engine temperature, ambient pressure and temperature. A MAF sensor 18 measures the MAF (i.e., $MAF_{measured}$ to the intake 15 of the engine 16. Here, the engine 16 is a diesel engine having a turbocharger 20. Thus, the turbocharger 20 includes a compressor 22 and a turbine 24, here a variable geometry turbine. The turbine 24 is driven by a portion of the exhaust gases from the engine, with the remaining portion of such exhaust gases being recirculated back to the intake 15 of the engine through the EGR valve 14. Thus, the intake 15 of the engine 16 receives air passing through the ITH 12 and exhaust gases passing through the EGR valve 14. The amount of air passing through the ITH is a function of the position of the ITH 12. The position of the ITH 12 varies between a fully open position and a fully closed position in response to the control signal fed the to ITH 12 from the controller 10 via line 28 in a manner to be described. Likewise, the amount of exhaust gases passing through the EGR valve 14 is a function, inter alia, of the position of the EGR valve 14. The position of the EGR valve 14 varies between a fully open position and a full closed position in response to the control signal fed the to ECR valve 14 from the controller 10 via line 30, in a manner to be described.

As will be described in more detail below, the present invention recognizes this drawback and proposes to control the EGR rate by means of the mass air flow (MAF) in such a way that the intake throttle 12 is never closed further than it has to be. This is achieved by treating the EGR valve 14 and intake throttle 12 as a single actuator, with twice the range of the individual actuators, and by distributing the effort over EGR valve 14 and intake throttle ITH 12. Only after the EGR valve 14 is fully open do we shut the intake throttle 12 to achieve a MAF set point (i.e., $MAF_{desired}$) if it cannot desired be achieved with EGR valve 14 alone.

Figure 2:
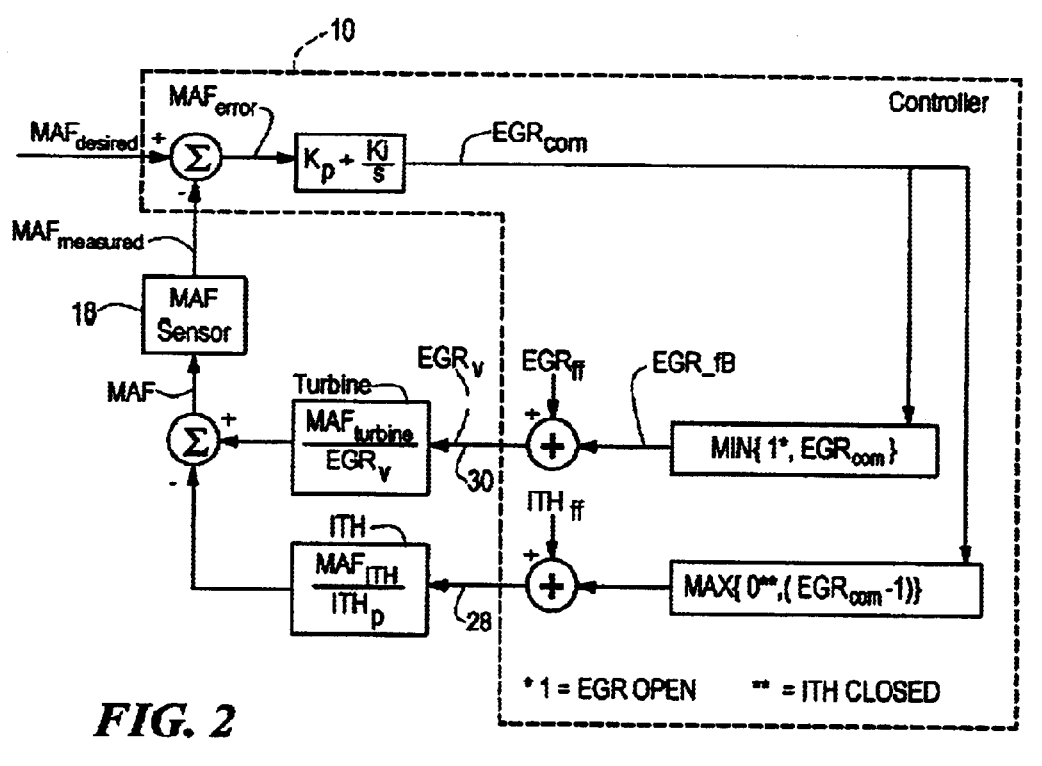
FIG. 2 is a more detailed functional block diagram of the control system of FIG. 1.

Here we adopt the following notation and conventions:
EGRv: EGR valve 14, 0=closed, 1=open
ITH: intake throttle 12 (flow area), 0=open, 1=closed.
Referring also to FIG. 2,
EGRcom: combined virtual EGR actuator, 0={EGRv=0, ITH=0}, 2={EGRv=1, ITH=1}
Then the algorithm proceeds as follows:
1. Look up the desired mass air flow value $MAF_{desired}$ as a function of speed and load (fuel quantity).
2. Form $MAF_{error} = MAF_{measured}\ MAF_{desired}$
3. Update the PI controller EGRcom=(Kp+Ki/s) *$MAF_{error}$
Where Kp and Ki are calibratable proportional and integral gain respectively. These parameters may be dependent on speed and load.
4. Set the feedback term EGRv_fb=min(1,EGRcom)
5. Add a feed forward term EGRv=EGRv_fb+EGRv_ff
6. Limit EGRv between 0 and 1, to avoid saturation.
7. Set the feedback term ITH_fb=max(0, EGRcom−1)
8. Add a feed forward term ITH=ITH_fb+ITH_ff
9. Limit ITH between 0 and 1, to avoid saturation.
Where EGRv represents the signal on line 30 in FIG., 1 and ITH represents the signal on line 28 in FIG. 1.
From the above, the following is observed:
The only way the intake throttle 12 can be closed (or at least partially closed) is if ITH is greater than 0. Further, ITH can only be greater than 0 if EGRv is 1 (i.e., if the EGR valve 14 is open). Thus, the only time ITH is used is to meet MAF is when the EGR valve 14 is fully open.

To put it another way, it is noted that the pair of control signal on lines 28 and 30 (FIG. 1) operate to drive the intake throttle 12 to a closed position only when the Mass Air Flow error signal is unable to be driven towards a null (i.e., towards zero) solely from adjustment by the EGR valve 14.

This may be shown by the flow diagram in FIG. S. The flow diagram presents computer code stored in a memory 11 in the controller 10, here a microprocessor desired above in connection with FIG. 1.

Thus, in accordance with the algorithm above, the computer code operates to first instruct the controller 10 to measure the Mass Air Flow ($MAF_{measured}$) from the MAF sensor 18 (FIG. 1), as shown in step 100. In Step 102, the controller 10 is fed a desired Mass Air Flow ($MAF_{desired}$), as described above. The controller 10 then forms the error signal $MAF_{error} = MAF_{measured} - MAF_{desired}$ as shown in Step 104. If the $MAF_{error}$ is greater than 0 in Step 106, the controller 10 determines if the EGR valve 14 is fully open, as shown in Steps 108. If the EGR valve 14 is not fully open, the EGR valve 14 is opened a small amount (Step 110) and the process repeats by returning to Step 100.

However, if in Step 108 it was determined that the EGR valve 14 was fully open, only then does the controller 10 operate to close the intake throttle 12 a small amount, as shown in Step 112, and then the process repeats by returning to Step 100.

On the other hand, if in Step 106 the $MAF_{error}$ was determined to be less than 0, the controller 10 determines whether the intake throttle 12 is fully open as shown in Step 114. If the intake throttle 12 was determined to be fully opened in Step 114, the EGR valve 14 is closed a small amount as shown in Step 116 and the process repeats by returning to Step 100. On the other hand, if in Step 114 the controller 10 determines that the intake throttle 12 is not fully open, the controller 10 opens the intake throttle 12 a small amount as shown in Step 118 and the process then repeats by returning to Step 100.

From the above, it is again noted that the pair of control signals on lines 28 and 30 (FIG. 1) operate to drive the intake throttle 12 to a closed position only when the Mass Air Flow error signal is unable to be driven towards a null (i.e., towards zero) solely from adjustment by the EGR valve 14.

Figure 3:
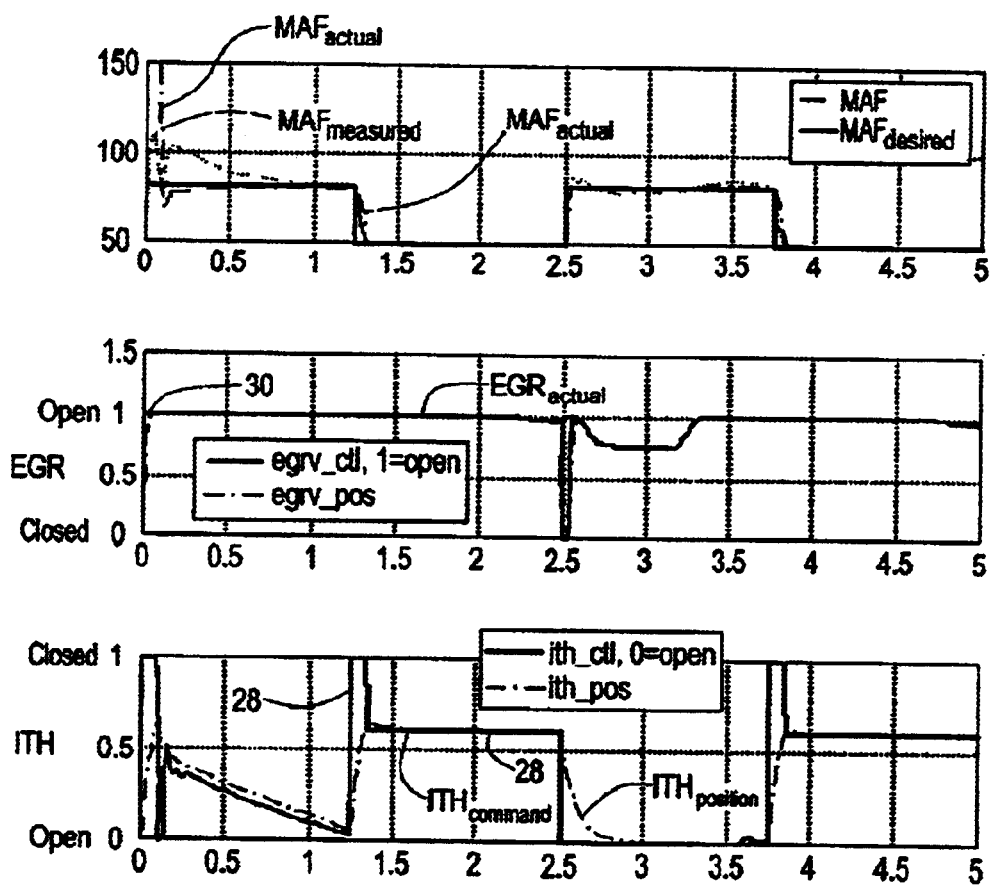
FIG. 3 are timing histories of parameters used in the control system of FIG. 1 according to the invention, such parameters being in response to step changes in commanded (or desired) mass air flow (MAF)

Referring now to FIG. 3, a simulation of the algorithm at a constant engine speed and load, for a changing MAF set point (i.e., $MAF_{desired}$) here changing from 80 to 50 at time 1.25 and then changing from 50 back to 80 at time 2.5. It clearly shows that the MAF set point (i.e., $MAF_{desired}$) is achieved (i.e., $MAF_{actual}$); that the intake throttle ITH 12 only closes when the EGR valve 14 is wide open (the command signal to the ITH 12 is on line 28 in FIG. 1 and the ITH actual position is shown in FIG. 2 as $ITH_{actual}$), and that the intake throttle ITH 12 is wide open when the MAF setpoint (i.e., $MAF_{desired}$) can be achieved with the EGR valve 14 alone. Note particularly that when the $MAF_{desired}$ command is from 80 to 50 at a time of 1.25 the requested MAF is achieved through the ITH 12 with the EGR valve 14 wide open thereby providing maximum EGR.

Figure 4:
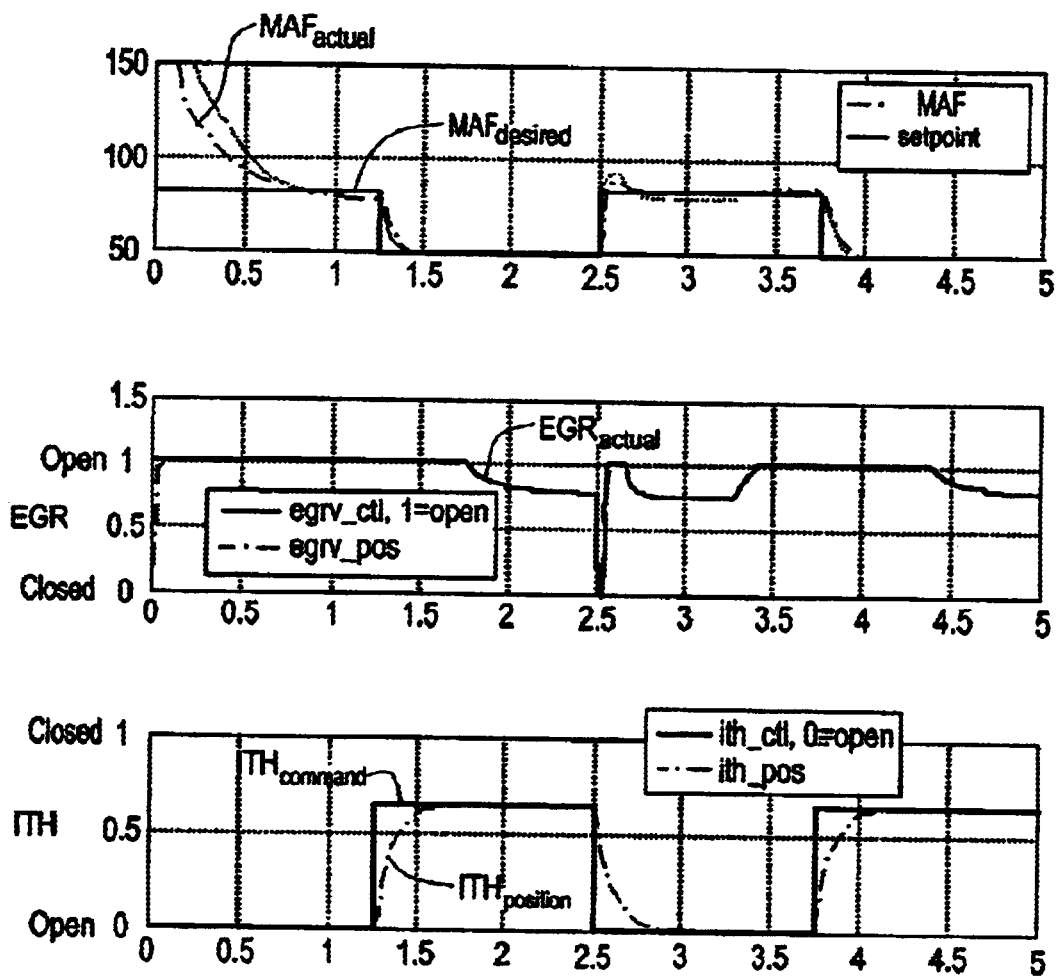
FIG. 4 are timing histories of parameters used in the control system according to the PRIOR ART, such parameters being in response to the same step changes in commanded (or desired) mass air flow (MAF) of FIG. 3.
Figure 5:
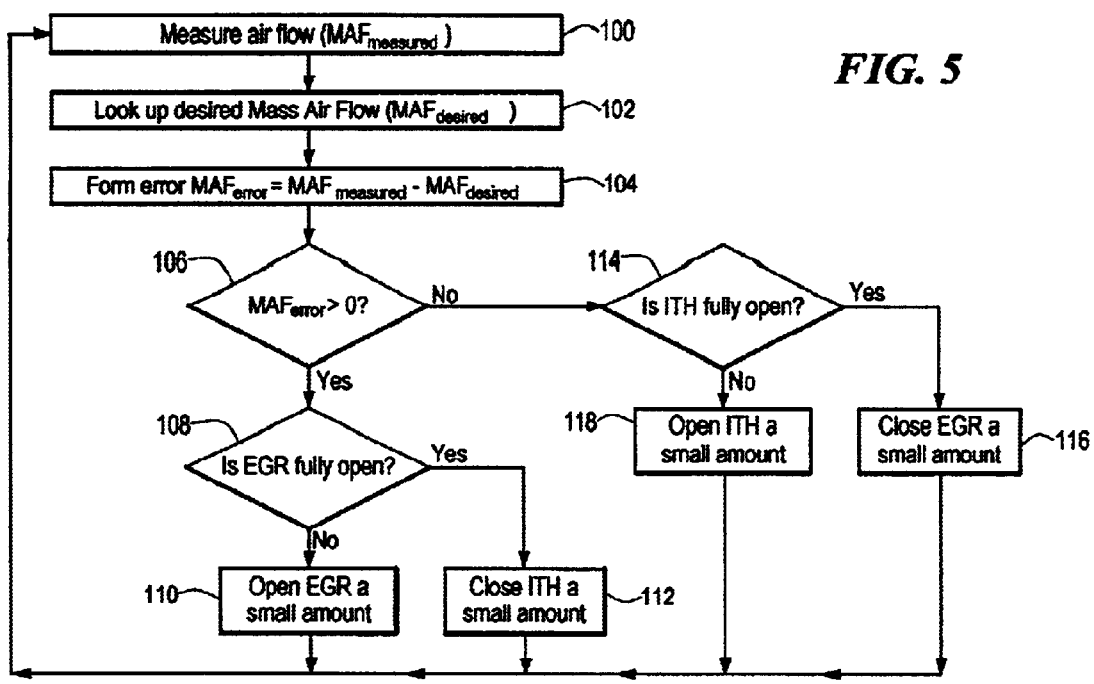
FIG. 5 is a flow diagram of the process used to control the EGR valve and an intake throttle (ITH) used in the engine of FIG. 1.

Referring now to FIG. 4, a conventional strategy that schedules ITH 12 open loop and relies on the EGR valve 14 only for MAF control using the same $MAF_{desired}$ as shown in FIG. 3 (i.e., changing MAF set point (i.e., $MAF_{desired}$) from 80 to 50 at time 1.25 and then changing from 50 back to 80 at time 2.5). FIG. 4 shows how the intake throttle ITH 12 is more closed than necessary since the EGR valve 14 closes to control MAF to its set point. It also shows that the EGR valve 14 is more closed to achieve the step reduction in $MAF_{desired}$ at time 1.25 and that to effect such step change in $MAF_{desired}$, the ITH is more closed with the conventional strategy than with the invention (FIG. 3). The simulation showed that at 2100 RPM, 30 Nm brake torque, the strategy according to the invention gives a brake specific fuel consumption (bsfc) of 646 g/kW-h for the 50 kg/h MAF set point while with the conventional strategy that schedules the intake throttle 12 position open loop, the bsfc is 714 g/kW-h. Thus, it is noted that one of the control signals, here the control signal on line 30 in FIG. 1, is used to adjust the EGR valve 14 provides adjustment only when the intake throttle ITH 12 is in a position to provide substantially maximum mass air flow through such ITH to the intake of the engine. Also, the pair of control signals on line 28 and 30 operate to drive the ITH initially to a substantially closed position in response to a detected reduction in the desired mass air flow and then to drive such ITH to a position to provide such reduced desired mass air flow with the EGR valve 14 in a position to provide maximum flow through such EGR valve 14. Further, the pair of control signals on line 28 and 30 operate to drive the ITH to a closed position only when such error signal $MAF_{error}=MAF_{desired}-MAF_{measured}$ is unable to be driven towards the null solely from adjustment by the EGR valve 14.

It should also be noted that:

1. Since the intake throttle 12 orifice size is a strongly nonlinear function of the angular position, ITH above is to be interpreted as a normalized and linearized throttle position. That is, ITH=0.5 corresponds to half the flow area of the intake throttle being blocked. To convert from ITH to throttle position, use the inverse of the effective area function:
    ITHpos=$A^{-1}$ (ITH) where A:ITHpos–>ITH maps the throttle position in degrees to the effective throttle area.

2. The throttle adds an extra volume in the intake duct with filling and emptying dynamics. One can use a nonlinear observer to control the throttle flow to the desired MAF setpoint, as opposed to the actual mass air flow. This results in faster air flow dynamics. An example is the following observer: Equation.

$$\frac{d}{dt}\hat{p}_t = (W_a - \hat{W}_t)k_t T_t + k_{obs}(p_1 - \hat{p}_1)$$

$$\hat{W}_t = A_t \frac{\hat{p}_t}{\sqrt{T_t}} \sqrt{1 - \frac{p_1}{\hat{p}_t}} k_f$$

$$\frac{d}{dt}\hat{p}_1 = \frac{R\gamma}{V_1}(W_t T_t + W_{egr} T_{egr} - W_{eng} T_1)$$

where subscript t stands for throttle, 1 for intake manifold, egr for EGR, eng for engine, p for pressure, W for flow, hat (i.e. ^) for estimate, T for temperature, kt–>$k_t$ is the manifold filling constant for the throttle volume, $k_f$ is the flow constant for the ITH flow, $k_{obs}$ is the observer gain.

A number of embodiments of the invention have been described. Nevertheless, it will be understood that various modifications may be made without departing from the spirit and scope of the invention. Accordingly, other embodiments are within the scope of the following claims.

What is claim is:

1. A method for controlling EGR rate of an internal combustion engine, such engine having an intake throttle for controlling mass flow to an intake of the engine and an EGR valve for controlling flow from the exhaust of the engine back to the intake of the engine along with air passing through the intake throttle, such method comprising:
    measuring a mass air flow passing to the intake throttle;
    comparing such measured mass air flow with a desired mass air flow;
    producing an error signal representative of a difference between the measured mass air flow and the desired mass air flow;
    producing a pair of control signals in response to such produced error signal;
    using one of the pair of control signals to adjust the intake throttle to control mass air flow through such intake throttle;
    using the other one of the pair of control signals to adjust EGR rate through the EGR valve; and
    wherein the pair of control signals operate the intake throttle and the EGR valve to drive the error signal to a null.

2. A method for controlling EGR rate of an internal combustion engine, such engine having an intake throttle for controlling mass flow to an intake of the engine and an EGR valve for controlling flow from the exhaust of the engine back to the intake of the engine along with air passing through the intake throttle, such method comprising:
    measuring a mass air flow passing to the intake throttle;
    comparing such measured mass air flow with a desired mass air flow;
    producing an error signal representative of a difference between the measured mass air flow and the desired mass air flow;
    producing a pair of control signals in response to such produced error signal;
    using one of the pair of control signals to adjust the intake throttle to control mass air flow through such intake throttle;
    using the other one of the pair of control signals to adjust EGR rate through the EGR valve;
    wherein the pair of control signals operate the intake throttle and the EGR valve to drive the error signal towards a null; and
    wherein the one of the control signals used to adjust the EGR valve is used to provide such adjustment only when the intake throttle is in a position to provide substantially maximum mass air flow through such intake throttle to the intake of the engine.

3. A method for controlling EGR rate of an internal combustion engine, such engine having an intake throttle for controlling mass flow to an intake of the engine and an EGR valve for controlling flow from the exhaust of the engine back to the intake of the engine along with air passing through the intake throttle, such method comprising:
    measuring a mass air flow passing to the intake throttle;
    comparing such measured mass air flow with a desired mass air flow;
    producing an error signal representative of a difference between the measured mass air flow and the desired mass air flow;
    producing a pair of control signals in response to such produced error signal;
    using one of the pair control signals to adjust the intake throttle to control mass air flow through such intake throttle;
    using the other one of the pair of control signals to adjust EGR rate through the EGR valve;
    wherein the pair of control signals operate the intake throttle and the EGR valve to drive the error signal towards a null; and
    wherein the pair of control signals operate to drive the throttle initially to a substantially closed position in response to a detected reduction in the desired mass air flow and then to drive such throttle to a position to provide such reduced desired mass air flow with the EGR valve in a position to provide maximum flow through such EGR valve.

4. A method for controlling EGR rate of an internal combustion engine, such engine having an intake throttle for controlling mass flow to an intake of the engine and an EGR valve for controlling flow from the exhaust of the engine back to the intake of the engine along with air passing through the intake throttle, such method comprising:

measuring a mass air flow passing to the intake throttle;

comparing such measured mass air flow with a desired mass air flow;

producing an error signal representative of a difference between the measured mass air flow and the desired mass air flow;

producing a pair of control signals in response to such produced error signal;

using one of the pair of control signals to adjust the intake throttle to control mass air flow through such intake throttle;

using the other one of the pair of control signals to adjust EGR rate through the EGR valve; and wherein the pair of control signals operate to drive the throttle to a closed position only when such error signal is unable to be driven towards the null solely from adjustment by the EGR valve.

5. The method recited in claim 4 wherein the engine includes a turbocharger having a compressor and a turbine coupled to the compressor and wherein a portion of engine exhaust is directed to the EGR valve and another portion of the engine exhaust is directed to the turbine such portions being adjusted by the one of the control signals adjusting the EGR valve; wherein the portion of the engine exhaust to the turbine drives the compressor which in turn drives the mass air flow and wherein the mass air flow from the compressor turbocharger passes to the intake throttle and wherein the intake throttle adjustment adjusts the mass air flow.

6. The method recited in claim 4 wherein the engine includes a turbocharger having a compressor and a turbine coupled to the compressor and wherein a portion of engine exhaust is directed to the EGR valve and another portion of the engine exhaust is directed to the turbine such portions being adjusted by the one of the control signals adjusting the EGR valve; wherein the portion of the engine exhaust to the turbine drives the compressor which in turn drives the mass air flow and wherein the mass air flow from the compressor turbocharger passes to the intake throttle and wherein the intake throttle adjustment adjusts the mass air flow.

7. A controller for controlling EGR rate of an internal combustion engine, such engine having an intake throttle for controlling mass flow to an intake of the engine and EGR valve for controlling flow from the exhaust of the engine back to the intake of the engine along with air passing through the intake throttle, such controller being programmed to:

measure a mass air flow passing to the intake throttle;

compare such measured mass air flow with a desired mass air flow;

produce an error signal representative of a difference between the measured mass air flow and the desired mass air flow;

produce a pair of control signals in response to such produced error signal;

wherein one of the pair of control signals is used to adjust the intake throttle to control mass air flow through such intake throttle;

wherein the other one of the pair of control signals is used to adjust EGR rate through the EGR valve; and wherein the pair of control signals operate the intake throttle and the EGR valve to drive the error signal to a null.

8. A controller for controlling EGR rate of an internal combustion engine, such engine having an intake throttle for controlling mass flow to an intake of the engine and EGR valve for controlling flow from the exhaust of the engine back to the intake of the engine along with air passing through the intake throttle, such controller being programmed to:

measure a mass air flow passing to the intake throttle;

compare such measured mass air flow with a desired mass air flow;

produce an error signal representative of a difference between the measured mass air flow and the desired mass in flow;

produce a pair of control signals in response to such produced error signal;

wherein one of the pair of control signals is used to adjust the intake throttle to control mass air flow through such intake throttle;

wherein the other one of the pair of control signals is used to adjust EGR rate through the EGR valve;

wherein the pair of control signals operate the intake throttle and the EGR valve to drive the error signal towards a null; and wherein the one of the control signals used to adjust the EGR is used to provide such adjustment only when the intake throttle is in a position to provide substantially maximum mass air flow through such intake throttle to the intake of the engine.

9. A controller for controlling EGR rate of an internal combustion engine, such engine having an intake throttle for controlling mass flow to an intake of the engine and EGR valve for controlling flow from the exhaust of the engine back to the intake of the engine along with air passing through the intake throttle, such controller being programmed to:

measure a mass air flow passing to the intake throttle;

compare such measured mass air flow with a desired mass air flow;

produce an error signal representative of a difference between the measured mass air flow and the desired mass air flow;

produce a pair of control signals in response to such produced error signal;

wherein one of the pair of control signals is used to adjust the intake throttle to control mass air flow through such intake throttle;

wherein the other one of the pair of control signals is used to adjust EGR rate through the EGR valve;

wherein the pair of control signals operate the intake throttle and the EGR valve to drive the error signal towards a null; and wherein the pair of control signals operate to drive the throttle initially to a substantially closed position in response to a detected reduction in the desired mass air flow and then to drive such throttle to a position to provide such reduced desired mass air flow with the EGR valve in a position to provide maximum flow through such EGR valve.

10. A controller for controlling EGR rate of an internal combustion engine, such engine having an intake throttle for controlling mass flow to an intake of the engine and an EGR valve for controlling flow from the exhaust of the engine back to the intake of the engine along with air passing through the intake throttle, such controller being programmed to:

measure a mass air flow passing to the intake throttle;

compare such measured mass air flow with a desired mass air flow;

produce an error signal representative of a difference between the measured mass air flow and the desired mass air flow;

produce a pair of control signals in response to such produced error signal; and wherein one of the pair of control signals is used to adjust the intake throttle to control mass air flow through such intake throttle;

wherein the other one of the pair of control signals is used to adjust EGR rate through the EGR valve; and wherein the pair of control signals operate to drive the throttle to a closed position only when such error signal is unable to be driven towards the null solely from adjustment by the EGR valve.

11. An article of manufacture, comprising:

a computer storage medium having a program encoded therein for controlling EGR rate of an internal combustion engine, such engine having an intake throttle for controlling mass flow to an intake of the engine and an EGR valve for controlling flow from the exhaust of the engine back to the intake of the engine along with air passing through the intake throttle, such storage medium comprising:

code for measuring a mass air flow passing to the intake throttle;

code for comparing such measured mass air flow with a desired mass air flow;

code for producing an error signal representative of a difference between the measured mass air flow and the desired mass air flow;

code for producing a pair of control signals in response to such produced error signal, one of the pair of control signals being used to adjust the intake throttle to control mass air flow through such intake throttle and the other one of the pair of control signals being used to adjust EGR rate through the EGR valve; and wherein the pair of control signals is used to operate the intake throttle and the EGR valve to drive the error signal to a null.

12. A controller for controlling EGR rate of an internal combustion engine, such engine having an intake throttle for controlling mass flow to an intake of the engine and EGR valve for controlling flow from the exhaust of the engine back to the intake of the engine along with air passing through the intake throttle, such controller being programmed to:

measure a mass air flow passing to the intake throttle;

compare such measured mass air flow with a desired mass air flow;

produce an error signal representing the of a difference between the measured mass air flow and the desired mass air flow;

produce a pair of control signals in response to such produced error signal;

wherein one of the pair of control signals is used to adjust the intake throttle to control mass air flow through such intake throttle;

wherein the other one of the pair of control signals is used to adjust EGR rate through the EGR valve;

wherein the pair of control signals operate the intake throttle and the EGR valve to drive the error signal towards a null; and wherein the one of the control signals used to adjust the EGR valve is used to provide such adjustment only when the intake throttle is in a position to provide substantially maximum mass air flow through such intake throttle to the intake of the engine.

13. A controller for controlling EGR rate of an internal combustion engine, such engine having an intake throttle for controlling mass flow to an intake of the engine and EGR valve for controlling flow from the exhaust of the engine back to the intake of the engine along with air passing through the intake throttle, such controller being programmed to:

measure a mass air flow passing to the intake throttle;

compare such measured mass air flow with a desired mass air flow;

produce an error signal representative of a difference between the measured mass air flow and the desired mass air flow;

produce a pair of control signals response to such produced error signal;

wherein one of the pair of control signals is used to adjust the intake throttle to control mass air flow through such intake throttle;

wherein the other one of the pair of control signals is used to adjust EGR rate through the EGR valve;

wherein the pair of control signals operate the intake throttle and the EGR valve to drive the error signal towards a null; and wherein the pair of control signals operate to drive the throttle initially to a substantially closed position in response to a detected reduction in the desired mass air flow and then to drive such throttle to a position to provide such reduced desired mass air flow with the EGR valve in a position to provide maximum flow through such EGR valve.

14. An article of manufacture, comprising:

a computer storage medium having a program encoded therein for controlling EGR rate of an internal combustion engine, such engine having an intake throttle for controlling mass flow to an intake of the engine and an EGR valve for controlling flow from the exhaust of the engine back to the intake of the engine along with air passing through the intake throttle, such medium comprising:

code for measuring a mass air flow passing to the intake throttle;

code for comparing such measured mass air flow with a desired mass air flow;

code for producing an error signal representative of a difference between the measured mass air flow and the desired mass air flow;

code for producing a pair of control signals in response to such produced error signal;

wherein one of the pair of control signals is used to adjust the intake throttle to control mass air flow through such intake throttle;

wherein the other one of the pair of control signals is used to adjust EGR rate through the EGR valve; and wherein the pair of control signals operate to drive the throttle to a closed position only when such error signal is unable to be driven towards the null solely from adjustment by the EGR valve.

* * * * *